US012622408B2

(12) United States Patent
Cheng

(10) Patent No.: US 12,622,408 B2
(45) Date of Patent: May 12, 2026

(54) RETRACTABLE, DETACHABLE AND PORTABLE PET STROLLER

(71) Applicant: HUBEI DOUHAHA TECHNOLOGY CO., LTD., Hanchuan City (CN)

(72) Inventor: Xingguo Cheng, Hanchuan City (CN)

(73) Assignee: HUBEI DOUHAHA TECHNOLOGY CO., LTD., Xiaogan City (CN)

( * ) Notice: Subject to any disclaimer, the term of this patent is extended or adjusted under 35 U.S.C. 154(b) by 328 days.

(21) Appl. No.: 18/455,607

(22) Filed: Aug. 24, 2023

(65) Prior Publication Data

US 2023/0397570 A1     Dec. 14, 2023

(51) Int. Cl.
 *A01K 1/02* (2006.01)
(52) U.S. Cl.
 CPC .................................. *A01K 1/0245* (2013.01)
(58) Field of Classification Search
 CPC .............................. A01K 1/0245; B62B 7/142
 See application file for complete search history.

(56) References Cited

U.S. PATENT DOCUMENTS

| | | | | | |
|---|---|---|---|---|---|
| 5,718,439 | A | * | 2/1998 | Wang ...................... | B62B 7/142 |
| | | | | | 280/47.38 |
| 5,820,144 | A | * | 10/1998 | Wang ...................... | B62B 7/142 |
| | | | | | 280/47.38 |

| | | | | | |
|---|---|---|---|---|---|
| 10,667,489 | B2 | * | 6/2020 | Jakubowski ......... | A01K 1/0236 |
| 12,408,623 | B2 | * | 9/2025 | Jakubowski ......... | A01K 1/0272 |
| 2014/0230747 | A1 | * | 8/2014 | Jakubowski .............. | B62B 9/26 |
| | | | | | 119/496 |
| 2018/0022371 | A1 | * | 1/2018 | Jakubowski .......... | B62B 5/0013 |
| | | | | | 280/641 |
| 2019/0002007 | A1 | * | 1/2019 | Xiang ....................... | B62B 9/26 |
| 2019/0053462 | A1 | * | 2/2019 | Lin ...................... | A01K 1/0236 |
| 2020/0236895 | A1 | * | 7/2020 | Cheung ................ | A01K 1/0272 |
| 2023/0217891 | A1 | * | 7/2023 | Xiang ....................... | B62B 7/06 |
| | | | | | 119/453 |

* cited by examiner

*Primary Examiner* — Brian L Swenson
(74) *Attorney, Agent, or Firm* — Addison D. Ault; IPGentleman Intellectual Property Services, LLC

(57) ABSTRACT

A retractable, detachable and portable pet stroller is disclosed, including a stroller body, a stroller basket and a folding roof. The stroller body is detachably connected with the stroller basket, and a locking mechanism for fixation is provided at a bottom of the stroller basket. The folding roof is detachably connected with the stroller basket, and a second locking mechanism for fixation is provided on the folding roof. A third locking mechanism for fixing a movable end of the folding roof is further provided at a top of the stroller basket. Because the stroller basket can be disassembled and folded, and the roof can also be disassembled and folded, the stroller basket can be used independently, offering flexibility and convenience when a user goes out with a pet.

8 Claims, 11 Drawing Sheets

1

RETRACTABLE, DETACHABLE AND PORTABLE PET STROLLER

This application claims priority to Chinese Patent Application No. 202321095479.2, filed on Jun. 21, 2023 before the China National Intellectual Property Administration, the disclosure of which is incorporated herein by reference in entirety.

TECHNICAL FIELD

The present invention relates to the field of pet supplies, in particular to a retractable, detachable and portable pet stroller.

BACKGROUND

With an improvement of people's living standards, more and more people keep pets, and for facilitating people to bring pets when they go out, pet bags, pet carts, or the like, are often used, and when people go out to travel or go to farther places, pet bags are more laborious than pet carts, but the pet carts on the market mostly have an integrative design at present, and are not convenient and occupy large spaces during carry.

Chinese patent No. CN209320991U proposes a pet cart, including a cart frame and a pet box, wherein the pet box is detachably connected with the cart frame, the cart frame can be folded or unfolded, and the pet box can be folded or unfolded. The detachable connection between the pet box and the cart frame enables the cart frame and the pet box to be separated as required for separate storage, carry or use, which solves the problem that the pet cart occupies a large space during carry.

Chinese patent No. CN212306458U proposes a pet cart, including a support body, a bag body, a plurality of gripping portions, and a plurality of moving portions. The support body includes a clamping portion and at least one connecting portion, the clamping portion is provided on one side of the support body, and the connecting portion is provided on the support body. The gripping portion is connected to the support body. The moving portion is connected below the support body. The bag body is detachably provided on the support body and includes at least one buckling end, and the buckling end is provided on at least one side of the bag body and corresponds to the connecting portion, thus strengthening stability between the support body and the bag body, solving a problem that the bag body and a stroller body are integral, and meanwhile strengthening stability between the bag body and the stroller body.

However, in the above-mentioned technologies, the bag bodies are closed by zippers, the closure is slow, the pet may jump out to cause danger, and meanwhile, the space in the bag body is low, movement of the pet in the bag is limited during walking, and the above-mentioned technologies are complicated during folding, disassembly, unfolding and assembly, and are not convenient.

SUMMARY

An object of the present invention is to provide a retractable, detachable and portable pet stroller, in which a stroller basket can be disassembled and folded, a roof can also be disassembled and folded, the stroller basket can be used independently, and more flexible and convenient effects are achieved when a user goes out with a pet.

In order to solve the above-mentioned technical problems, the following technical solution is adopted in the present invention.

A retractable, detachable and portable pet stroller includes a stroller body, a stroller basket and a folding roof, wherein the stroller body is detachably connected with the stroller basket, a first locking mechanism for fixation is provided at a bottom of the stroller basket, the folding roof is detachably connected with the stroller basket, a second locking mechanism for fixation is provided on the folding roof, and a third locking mechanism for fixing a movable end of the folding roof is further provided at a top of the stroller basket; an occupied space can be reduced during storage by the detachable connection of the stroller basket and the stroller body, and meanwhile, the first locking mechanism enables a disassembly process of the stroller basket to be faster and more convenient, and the detachable connection of the folding roof and the stroller basket also reduces the space occupied during storage, such that carry is more convenient; flexible use can be realized when a user goes out, the stroller basket can be independently used without carrying the roof, and the roof can also be quickly disassembled and mounted by the provided second locking mechanism; the third locking mechanism can fix the folding roof, and when the folding roof is closed, fixation is realized by the third locking mechanism to prevent the roof from being unfolded, such that a device is more flexible and changeable in use.

Further, in the present invention, the stroller basket includes a bottom frame, a top frame and a plurality of folding connecting rods, one end of each of the plural folding connecting rods is rotatably connected with the bottom frame, the other end of each of the plural folding connecting rods is rotatably connected with the top frame, and the bottom frame and the top frame are connected into a whole by the folding connecting rods, so as to realize an overall structure of the stroller basket; the folding connecting rods can be folded, such that a height of the stroller basket can be reduced during storage, an occupied area during storage can be reduced, and the stroller basket is more convenient to carry when the user goes out.

Further, in the present invention, the folding connecting rod includes a first rod body, a second rod body and a slide fastener, one end of the first rod body is rotatably connected with the top frame, the other end of the first rod body is rotatably connected with the second rod body, an end of the second rod body apart from the first rod body is rotatably connected with the bottom frame, and the slide fastener is slidably fitted over the first rod body; with the arrangement, when the stroller basket is required to be unfolded, the top frame of the stroller basket is lifted away from the bottom frame, and when the first rod body and the second rod body are rotated to be in a same straight line, the slide fastener is slid from the first rod body to a connection position of the first rod body and the second rod body, and at this point, the first rod body and the second rod body cannot realize bending rotation due to a limiting effect of the slide fastener, and unfolding and fixation of the stroller basket are completed; when the stroller basket is required to be folded, the slide fastener is only required to be slid away from the connection position of the first rod body and the second rod body, such that the first rod body and the second rod body realize bending rotation, a height of the stroller basket can be reduced, and folding is completed.

Further, in the present invention, the first locking mechanism includes a housing, a first hook, a second hook, a push plate and a first return spring, the housing is provided on one side of a bottom of the bottom frame, a first accommodating cavity and a first through hole are provided in the housing, the push plate and the first return spring are located in the first accommodating cavity, the push plate is slidably connected with an inner wall of the housing, one end of the first return spring is fixedly connected with the inner wall of the housing, the other end of the first return spring is fixedly connected with the push plate, the first hook penetrates through the first through hole to be connected with the push plate, and the second hook is provided at the bottom of the bottom frame; with the arrangement, when the stroller basket is required to be fixed on a stroller frame, the second hook is hooked on one cross beam column of the stroller frame, the stroller basket is rotated to be horizontally placed on the stroller frame, and at this point, the other cross beam column abuts against a bottom of the first hook, the push plate is then pulled, the first hook is driven by the push plate to retract, and is released from abutting against the other cross beam column, and at this point, the stroller basket can be placed on the stroller frame completely, the push plate is then loosened, and under an action of the first return spring, the push plate is pushed and drives the first hook, and the first hook is hooked on the other cross beam column to accomplish fixation of the stroller basket and the stroller body; when the stroller basket and the stroller body are required to be separated, the push plate is pulled similarly, the first hook is separated from the other cross beam column, the stroller basket can be rotated away from the stroller body, and clamping between the second hook and the cross beam column is released.

Further, in the present invention, the roof includes folding cloth, a movable frame and a plurality of support frames, the folding cloth includes a plurality of cloth bodies distributed in a sector shape, the plurality of support frames are connected with the plurality of cloth bodies at intervals respectively, and two ends of the folding cloth are connected with two ends of the movable frame respectively; the folding roof can be retracted and folded with the arrangement, and when the folding roof is required to be unfolded, the movable frame is only required to be pushed to fold the folding cloth, and meanwhile, the folding cloth cannot be collapsed due to an effect of the support frame, and therefore, use is convenient and simple.

Further, in the present invention, the second locking mechanism includes a first rotating part, a second rotating part and a clamping part, the first rotating part is rotatably connected with one side of the clamping part, the second rotating part is rotatably connected with the other side of the clamping part, and both the first rotating part and the second rotating part are connected with the movable frame; the top frame is further sleeved with a fixed block, and the fixed block is provided with a clamping groove for fixing the clamping part; the folding roof can be fixed on the stroller basket by the second locking mechanism, the fixation can be completed only by inserting the clamping part into the clamping groove in the fixed block provided on the top frame, the clamping part is provided with a folding and unfolding part, the folding and unfolding part is provided with a wedge-shaped hook, a groove is provided in the clamping groove, and when the clamping part is inserted into the clamping groove, the wedge-shaped hook is hooked on the groove in the clamping groove to finish the fixation; when the folding roof is required to be separated, the folding and unfolding part is only required to be pulled, the wedge-shaped hook on the folding and unfolding part is separated from the groove in the clamping groove, the fixation is released, the folding roof can be taken down, and the arrangement is easy to operate and convenient and rapid to use; the first rotating part and the second rotating part are both connected with the movable frame, and a folding function of the folding roof can be achieved under a rotating action of the first rotating part and the second rotating part.

Further, in the present invention, the third locking mechanism includes a first fixing part, a second fixing part, a first inner plug, a second return spring and a pair of first buttons, the first fixing part is connected with the movable frame, the second fixing part is connected with the bottom frame, the first fixing part is provided with a third through groove, the first inner plug is located in the third through groove, the first inner plug is provided with a fourth through groove, the two first buttons are provided at two ends of the fourth through groove respectively, the second return spring is located in the fourth through groove, two ends of the second return spring abut against the two first buttons respectively, two sides of the first fixing part are provided with second through holes for the first buttons to penetrate out respectively, the second fixing part is provided with a fifth through groove for accommodating the first fixing part, and two sides of the second fixing part are provided with third through holes for the first buttons to penetrate out respectively; the movable end of the folding roof can be fixed with the arrangement, and when the folding roof is required to be closed, movable frame is rotated to approach the top frame, and at this point, the two first buttons on the first fixing part are pressed, the first buttons are retracted into the first fixing part, the first fixing part can be inserted into the second fixing part, and at this point, due to an effect of the second return spring, the first button is pushed out of the first fixing part and penetrates out through the third through hole on the second fixing part, and a fixing effect of the first fixing part and the second fixing part is achieved, thereby realizing the fixation of the movable end of the folding roof; when the folding roof is required to be unfolded, the first button is pressed similarly, the first button is retracted into the first fixing part, and the first fixing part and the second fixing part can be separated.

Further, in the present invention, the retractable, detachable and portable pet stroller further includes a handle, the handle is detachably and rotatably connected with the top frame, and the top frame is provided with a rotating mechanism for rotating the handle; the provided handle can provide an effect when the stroller basket is used alone, and the handle is detachably connected with the stroller basket, such that an occupied space can be reduced after detachment during storage; meanwhile, due to the provided rotating mechanism, the handle can be rotated and horizontally placed when the stroller basket is fixed on the stroller body at ordinary times, use of the folding roof is not influenced, and when the handle is required to be used, normal use can be realized only by rotating the handle to be vertical.

Further, in the present invention, the rotating mechanism includes a knob, a limiting gear, a third return spring and an insert, the insert is provided with a first through groove and a second through groove, the limiting gear is slidably connected with the fixed block, an end of the limiting gear apart from the fixed block is located in the first through groove, a limiting protrusion is provided on a groove wall of the first through groove, teeth of the limiting gear abut against the limiting protrusion to fix the insert, one end of the knob is slidably sleeved with the second through groove, and an end of the knob penetrating through the second through groove is connected with the limiting gear; one end of the third return spring abuts against an inner wall of the insert, and the other end of the third return spring abuts against an inner wall of the knob; with the arrangement, when the handle is required to be rotated, only the knob is required to be pressed, the knob pushes the limiting gear to move to separate the limiting gear from the insert, a limiting effect of the limiting gear on the insert is lost, and the insert can rotate to drive the handle to rotate; after the handle is rotated to a required position, the knob is released, and under an action of the third return spring, the knob is pushed away to drive the limiting gear to move, the limiting gear enters the first through groove to limit the insert, and at this point, the insert cannot be rotated, and a fixing effect is achieved on rotation of the handle.

Further, in the present invention, the handle is provided with a fourth locking mechanism, the fourth locking mechanism includes a second inner plug, a fourth return spring and a second button, the second inner plug is located in the handle, the second inner plug is provided with a sixth through groove, the fourth return spring is located in the sixth through groove, one end of the fourth return spring abuts against an inner wall of the second inner plug, the other end of the fourth return spring abuts against the second button, the insert is provided with a second accommodating cavity for accommodating the handle, and the handle and the insert are both provided with fourth through holes for the second button to penetrate out; detachable connection of the handle can be realized by the fourth locking mechanism, and when the handle is required to be connected, the second button on the handle is pressed, the button is retracted into the sixth through groove, and at this point, the handle can be inserted into the second accommodating cavity in the insert, and under an action of the fourth return spring, when the second button moves to the fourth through hole, the second button penetrates out of the fourth through hole to realize fixation of the handle and the insert; when the handle is required to be taken down, the second button is pressed similarly, the second button is retracted into the sixth through groove, the fixing effect on the insert is released, and the handle can be separated from the insert.

The present invention has at least the following advantages or beneficial effects.

1. With the detachable connection between the stroller basket and the stroller body, the folding roof and the stroller basket, as well as the handle and the stroller basket, the device can be detached and separated during storage, and the occupied space during storage can be reduced.
2. With the provided folding connecting rod, the height of the stroller basket can be reduced for folding, the device can be conveniently stored and carried, and operation is easy and convenient.
3. By the provided rotating mechanism, the handle can be rotated to a horizontal position when the handle is not suitable, the use of the folding roof is not influenced, and meanwhile, the rotating mechanism is easy to operate and convenient and rapid to use.
4. By the provided third locking mechanism, the folding roof can be rapidly closed, fixed and unfolded, and the folding roof can be more rapidly closed when the pet is placed, so as to avoid that the pet jumps out to cause potential safety hazards.

BRIEF DESCRIPTION OF DRAWINGS

To describe the technical solutions in the embodiments of the present invention more clearly, the following briefly describes the accompanying drawings required in the embodiments. It should be understood that the following accompanying drawings show merely some embodiments of the present invention and therefore should not be considered as limiting the scope, and a person of ordinary skill in the art may still derive other related drawings from these accompanying drawings without creative efforts.

Figure 1:
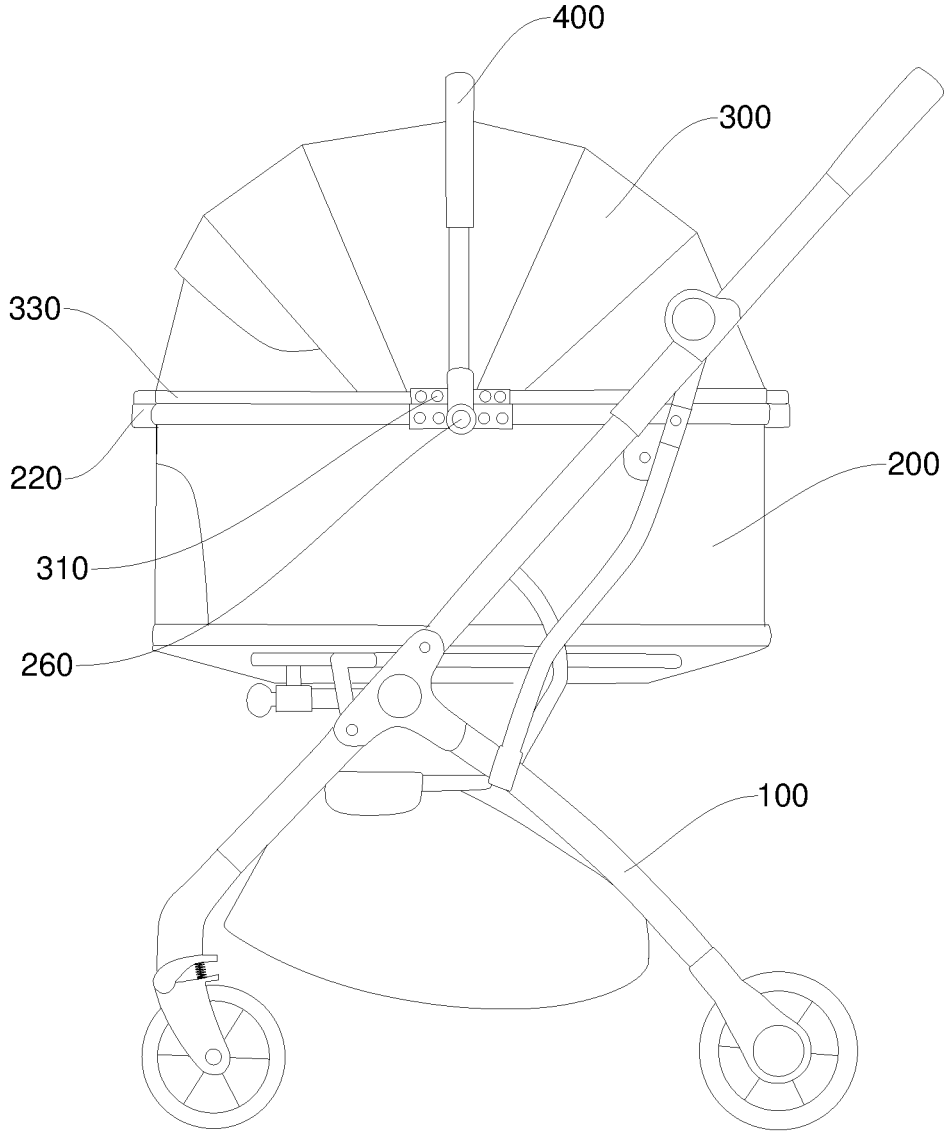
FIG. 1 is a first schematic overall structural diagram of a retractable, detachable and portable pet stroller according to the present invention.

Reference numerals: 100—stroller body; 200—stroller basket; 210—first locking mechanism; 211—housing; 212—first hook; 213—second hook; 214—push plate; 215—first return spring; 216—first accommodating cavity; 217—first through hole; 220—third locking mechanism; 221—first fixing part; 222—second fixing part; 223—first inner plug; 224—second return spring; 225—first button; 226—fourth through groove; 227—fifth through groove; 228—second through hole; 229—third through hole; 230—top frame; 240—bottom frame; 250—folding connecting rod; 251—first rod body; 252—second rod body; 253—slide fastener; 260—rotating mechanism; 261—knob; 262—limiting gear; 263—third return spring; 264—insert; 265—fixed block; 266—second accommodating cavity; 267—fourth through hole; 268—clamping groove; 300—folding roof; 310—second locking mechanism; 311—first rotating part; 312—second rotating part; 313—clamping part; 320—folding cloth; 330—movable frame; 340—support frame; 400—handle; 410—second inner plug; 420—fourth return spring; 430—second button; 440—sixth through groove.

DESCRIPTION OF EMBODIMENTS

To make the objectives, technical solutions and advantages of the embodiments of the present invention clearer, the technical solutions in the embodiments of the present invention are clearly and completely described with reference to the accompanying drawings in the embodiments of the present invention, and apparently, the described embodiments are not all but a part of the embodiments of the present invention. Generally, the assemblies of the embodiments of the present invention described and illustrated in the drawings herein may be arranged and designed in a variety of different configurations.

Accordingly, the following detailed description of the embodiments of the present invention provided in the drawings is not intended to limit the scope of protection of the present invention, but only represents selected embodiments of the present invention. All other embodiments obtained by a person of ordinary skill in the art based on the embodiments of the present invention without creative efforts shall fall within the protection scope of the present invention.

First Embodiment

Figure 2:
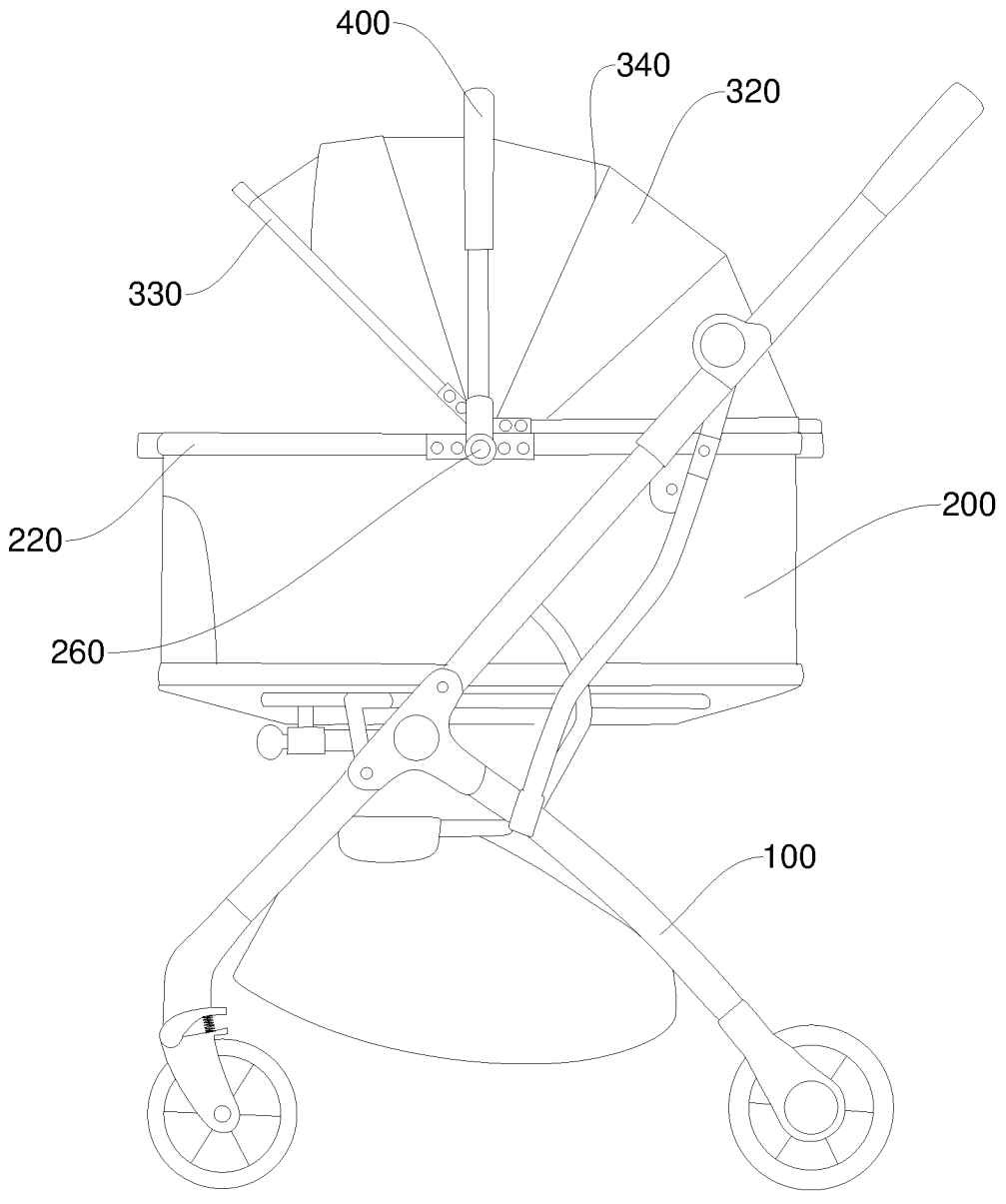
FIG. 2 is a second schematic overall structural diagram of the retractable, detachable and portable pet stroller according to the present invention.
Figure 3:
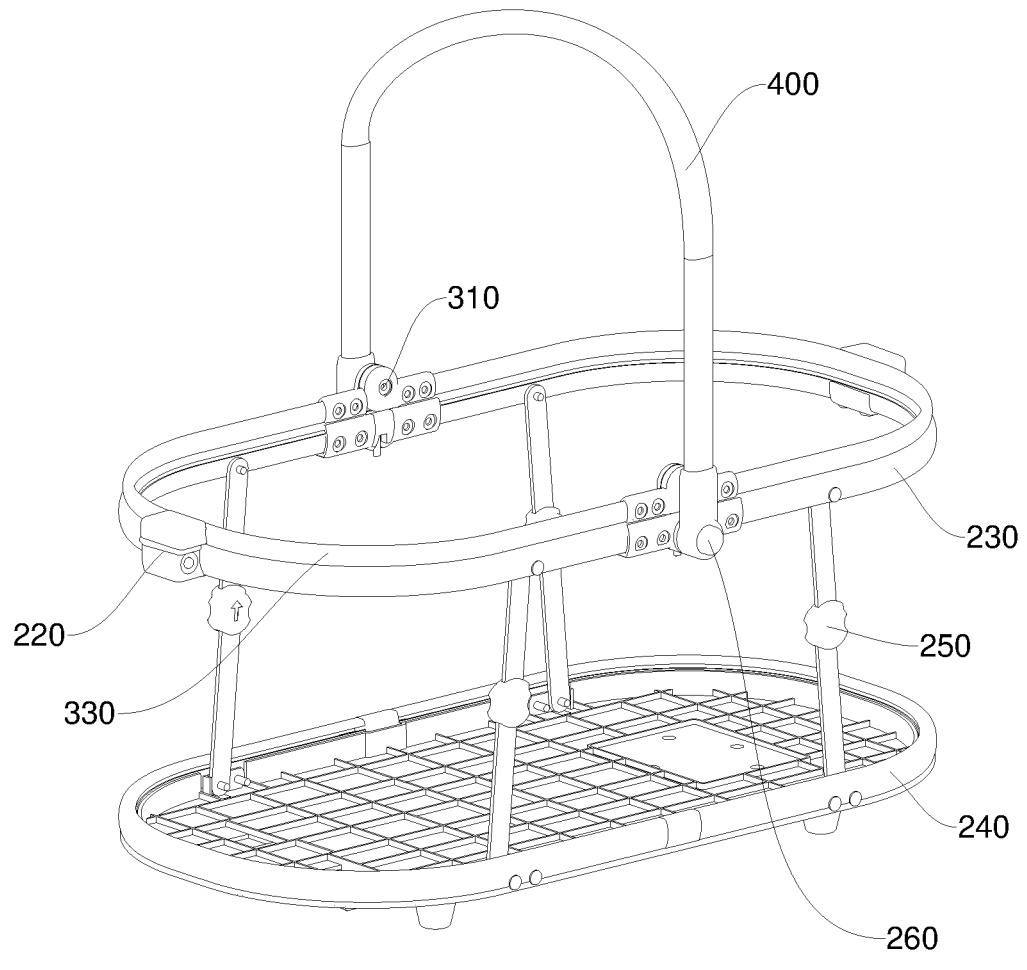
FIG. 3 is a schematic structural diagram of a stroller basket of the retractable, detachable and portable pet stroller according to the present invention.
Figure 4:
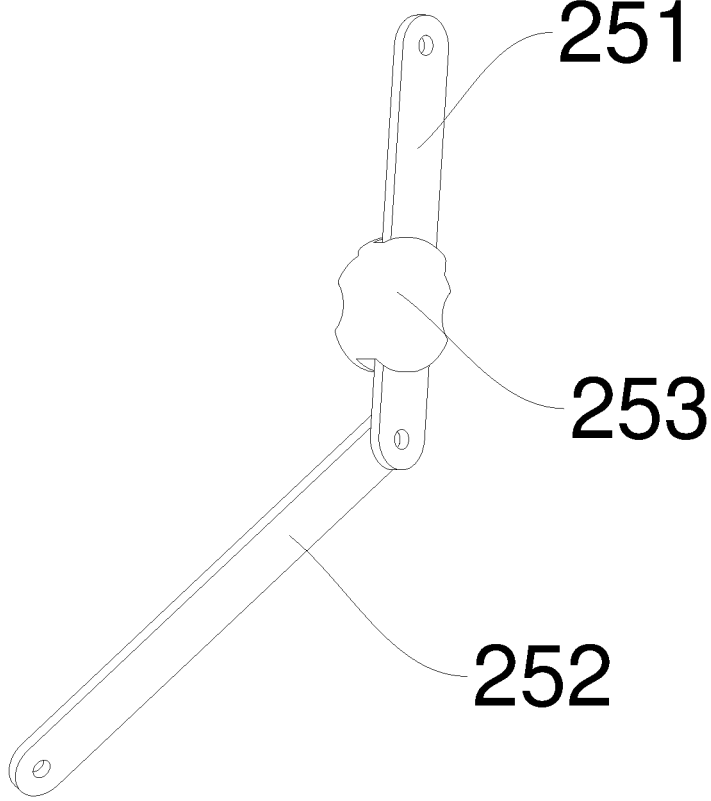
FIG. 4 is a schematic structural diagram of a folding connecting rod of the retractable, detachable and portable pet stroller according to the present invention.
Figure 5:
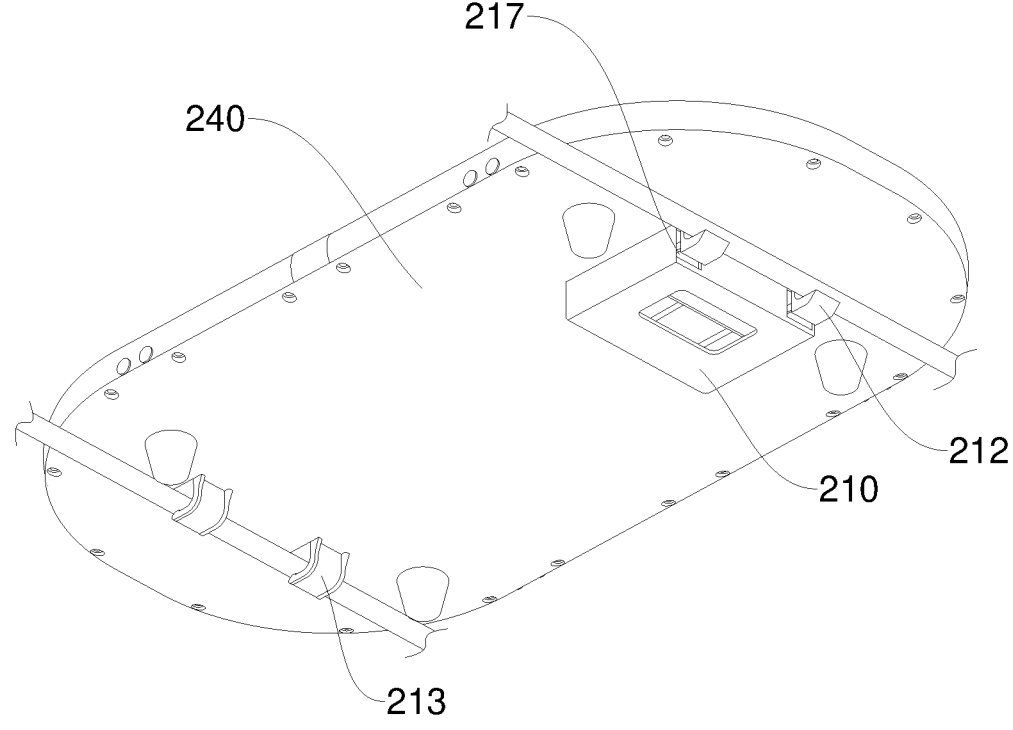
FIG. 5 is a first schematic structural diagram of a first locking mechanism of the retractable, detachable and portable pet stroller according to the present invention.
Figure 6:
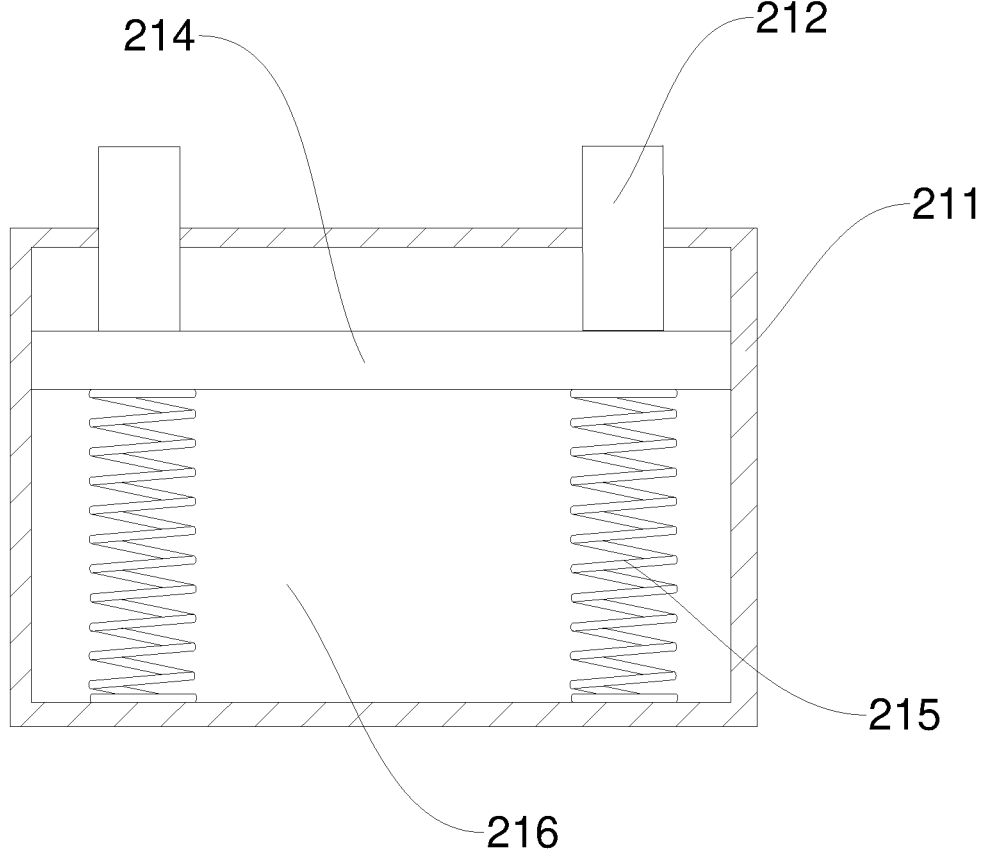
FIG. 6 is a second schematic structural diagram of the first locking mechanism of the retractable, detachable and portable pet stroller according to the present invention.
Figure 7:
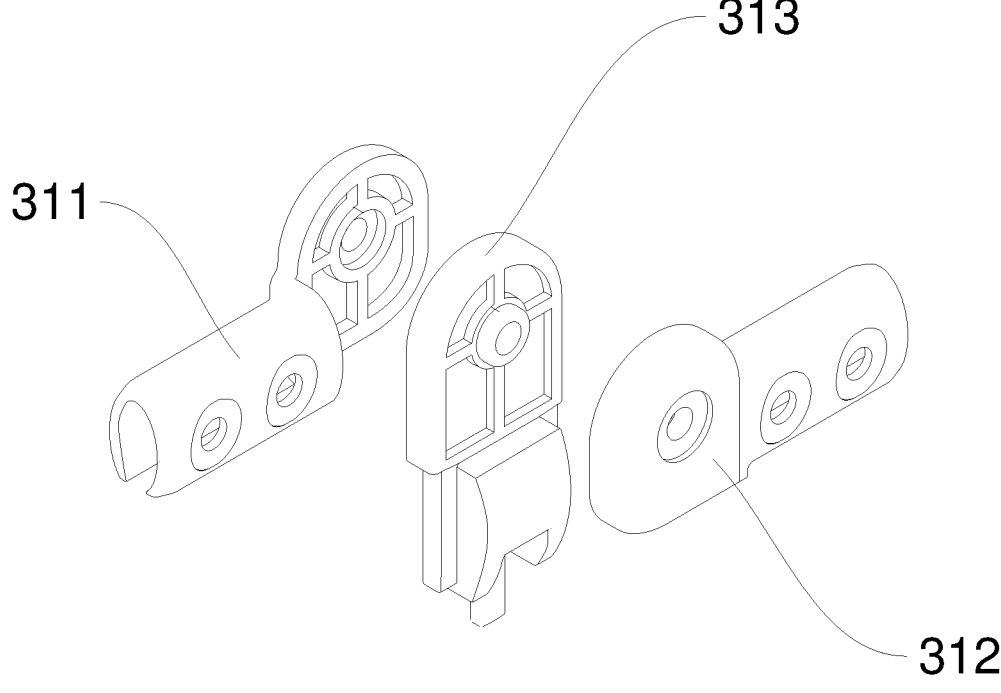
FIG. 7 is a schematic structural diagram of a second locking mechanism of the retractable, detachable and portable pet stroller according to the present invention.
Figure 8:
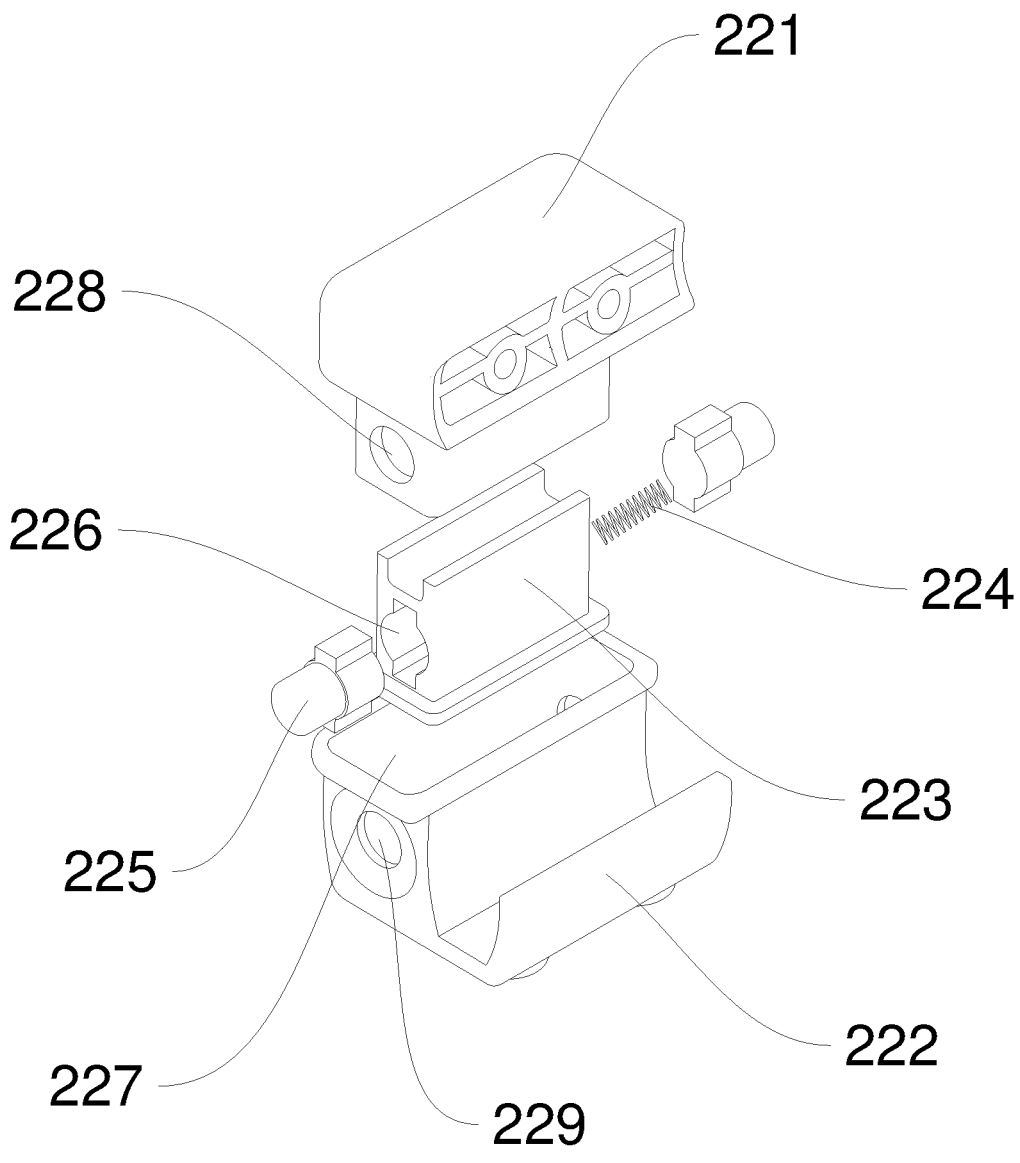
FIG. 8 is a schematic structural diagram of a third locking mechanism of the retractable, detachable and portable pet stroller according to the present invention.
Figure 9:
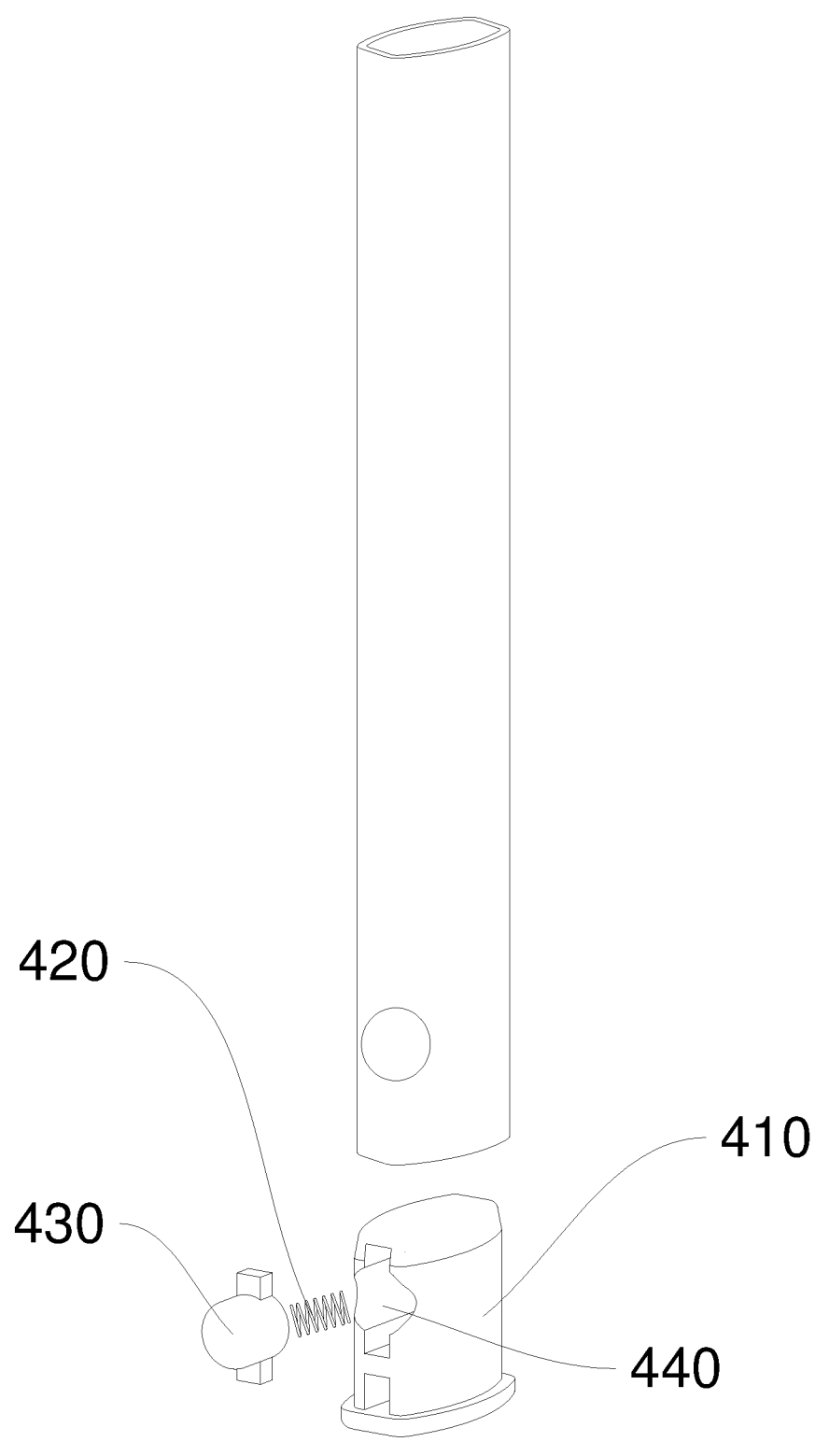
FIG. 9 is a schematic structural diagram of a fourth locking mechanism of the retractable, detachable and portable pet stroller according to the present invention.
Figure 10:
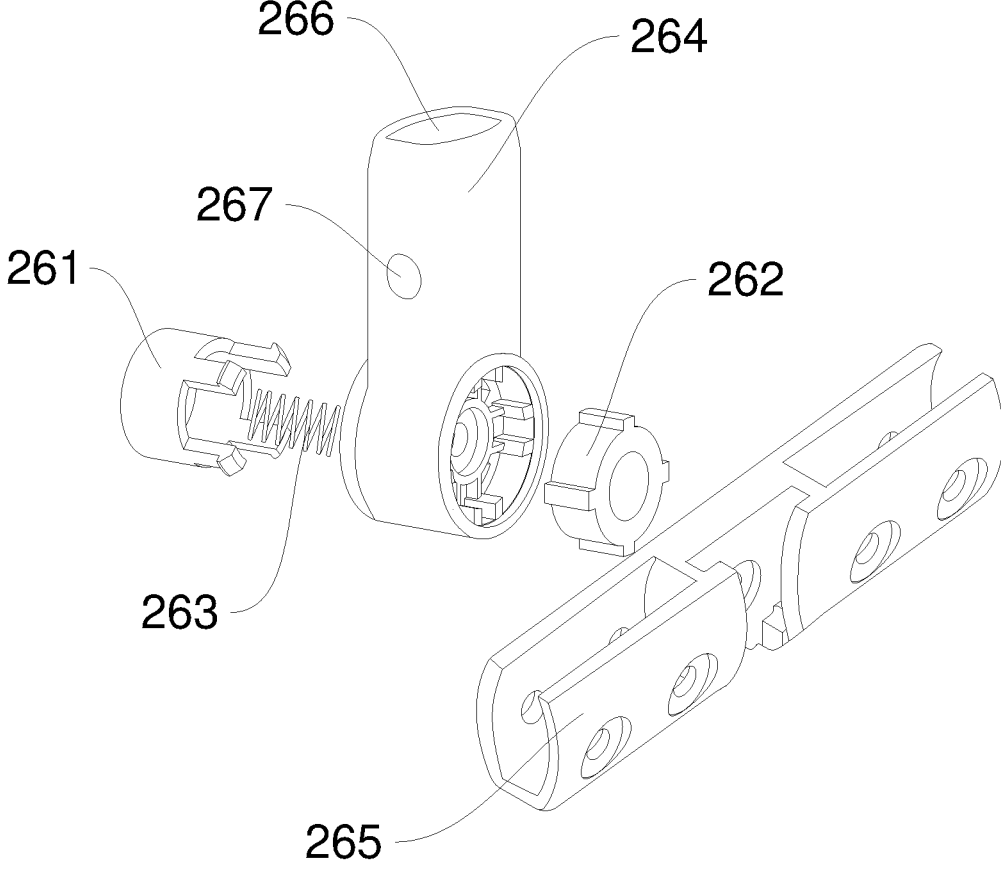
FIG. 10 is a schematic structural diagram of a rotating mechanism of the retractable, detachable and portable pet stroller according to the present invention.
Figure 11:
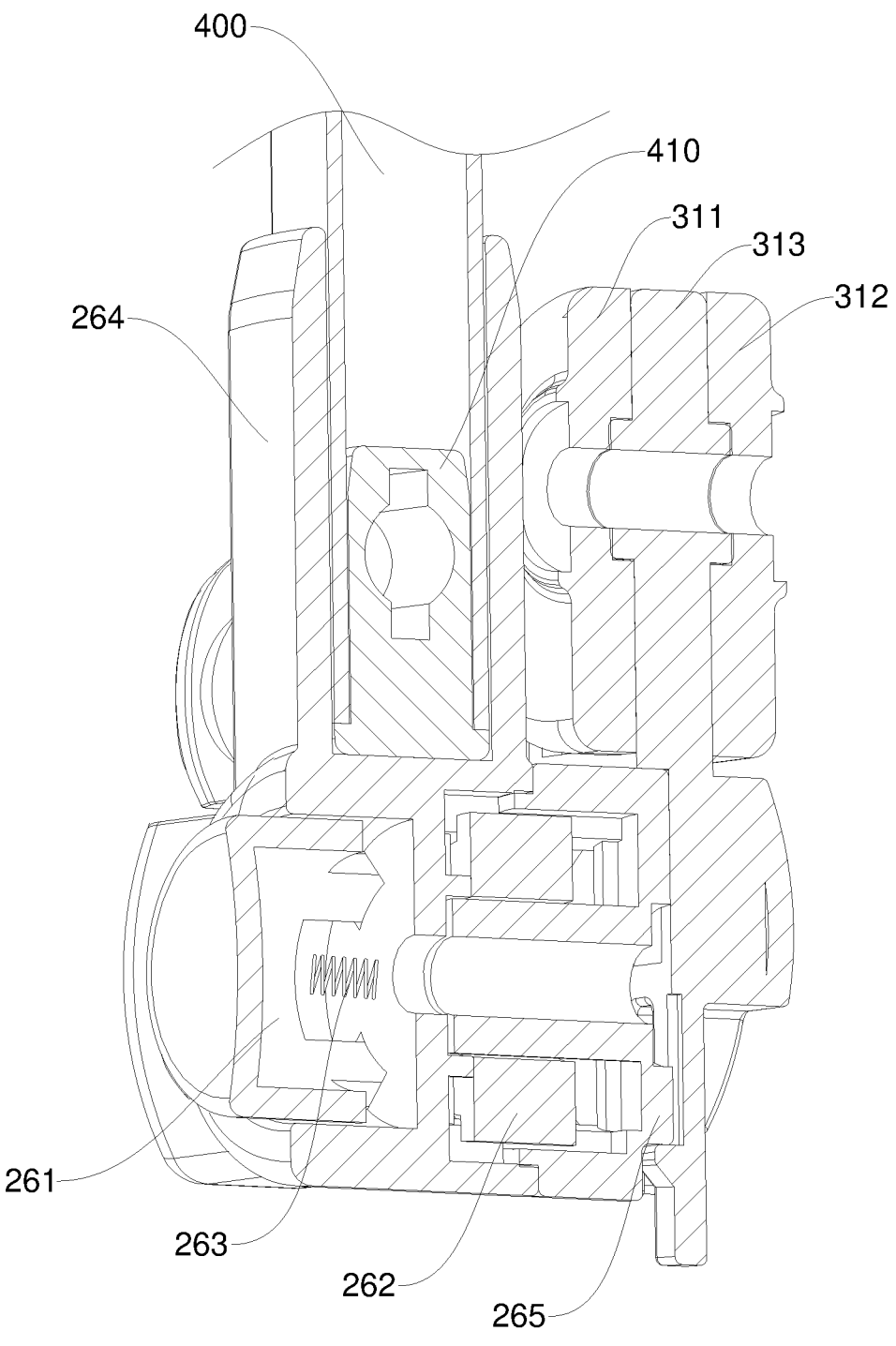
FIG. 11 is a structural sectional view of the second locking mechanism and the rotating mechanism of the retractable, detachable and portable pet stroller according to the present invention.

Reference is made to FIGS. 1 to 11, FIG. 1 shows a first schematic overall structural diagram according to an embodiment of the present invention; FIG. 2 shows a second schematic overall structural diagram according to the embodiment of the present invention; FIG. 3 shows a schematic structural diagram of a stroller basket 200 in the embodiment of the present invention; FIG. 4 shows a schematic structural diagram of a folding connecting rod 250 in the embodiment of the present invention; FIG. 5 shows a first schematic structural diagram of a first locking mechanism 210 in the embodiment of the present invention; FIG. 6 shows a second schematic structural diagram of the first locking mechanism 210 in the embodiment of the present invention; FIG. 7 shows a schematic structural diagram of a second locking mechanism 310 in the embodiment of the present invention; FIG. 8 shows a schematic structural diagram of a third locking mechanism 220 in the embodiment of the present invention; FIG. 9 shows a schematic structural diagram of a fourth locking mechanism in the embodiment of the present invention; FIG. 10 shows a schematic structural diagram of a rotating mechanism 260 in the embodiment of the present invention; and FIG. 11 shows a structural sectional view of the second locking mechanism 310 and the rotating mechanism 260 in the embodiment of the present invention.

The embodiment provides a retractable, detachable and portable pet stroller, including a stroller body 100, a stroller basket 200 and a folding roof 300, wherein the stroller body 100 is detachably connected with the stroller basket 200, a first locking mechanism 210 for fixation is provided at a bottom of the stroller basket 200, the folding roof 300 is detachably connected with the stroller basket 200, a second locking mechanism 310 for fixation is provided on the folding roof 300, and a third locking mechanism 220 for fixing a movable end of the folding roof 300 is further provided at a top of the stroller basket 200.

It can be understood that an occupied space can be reduced during storage by the detachable connection of the stroller basket 200 and the stroller body 100, and meanwhile, the first locking mechanism 210 enables a disassembly process of the stroller basket 200 to be faster and more convenient, and the detachable connection of the folding roof 300 and the stroller basket 200 also reduces the space occupied during storage, such that carry is more convenient; flexible use can be realized when a user goes out, the stroller basket 200 can be independently used without carrying the roof, and the roof can also be quickly disassembled and mounted by the provided second locking mechanism 310; the third locking mechanism 220 can fix the folding roof 300, and when the folding roof 300 is closed, fixation is realized by the third locking mechanism 220 to prevent the roof from being unfolded, such that a device is more flexible and changeable in use.

As shown in FIGS. 1 to 11, in the embodiment, the stroller basket 200 includes a bottom frame 240, a top frame 230 and a plurality of folding connecting rods 250, one end of each of the plural folding connecting rods 250 is rotatably connected with the bottom frame 240, the other end of each of the plural folding connecting rods is rotatably connected with the top frame 230.

It can be understood that the bottom frame 240 and the top frame 230 are connected into a whole by the folding connecting rods 250, so as to realize an overall structure of the stroller basket 200; the folding connecting rods 250 can be folded, such that a height of the stroller basket 200 can be reduced during storage, an occupied area during storage can be reduced, and the stroller basket is more convenient to carry when the user goes out.

As shown in FIGS. 1 to 11, in the embodiment, the folding connecting rod 250 includes a first rod body 251, a second rod body 252 and a slide fastener 253, one end of the first rod body 251 is rotatably connected with the top frame 230, the other end of the first rod body 251 is rotatably connected with the second rod body 252, an end of the second rod body 252 apart from the first rod body 251 is rotatably connected with the bottom frame 240, and the slide fastener 253 is slidably fitted over the first rod body 251.

It can be understood that with the arrangement, when the stroller basket 200 is required to be unfolded, the top frame 230 of the stroller basket 200 is lifted away from the bottom frame 240, and when the first rod body 251 and the second rod body 252 are rotated to be in a same straight line, the slide fastener 253 is slid from the first rod body 251 to a connection position of the first rod body 251 and the second rod body 252, and at this point, the first rod body 251 and the second rod body 252 cannot realize bending rotation due to a limiting effect of the slide fastener 253, and unfolding and fixation of the stroller basket 200 are completed; when the stroller basket 200 is required to be folded, the slide fastener 253 is only required to be slid away from the connection position of the first rod body 251 and the second rod body 252, such that the first rod body 251 and the second rod body 252 realize bending rotation, a height of the stroller basket 200 can be reduced, and folding is completed.

As shown in FIGS. 1 to 11, in the embodiment, the roof includes folding cloth 320, a movable frame 330 and a plurality of support frames 340, the folding cloth 320 includes a plurality of cloth bodies distributed in a sector shape, the plurality of support frames 340 are connected with the plurality of cloth bodies at intervals respectively, and two ends of the folding cloth 320 are connected with two ends of the movable frame 330 respectively.

It can be understood that the folding roof 300 can be retracted and folded with the arrangement, and when the folding roof 300 is required to be unfolded, the movable frame 330 is only required to be pushed to fold the folding cloth 320, and meanwhile, the folding cloth 320 cannot be collapsed due to an effect of the support frame 340, and therefore, use is convenient and simple.

It should be noted that the folding roof 300 has a similar principle to a roof of a baby stroller, is a common means in a prior art, and is connected in various forms, those skilled in the art can select an appropriate connection manner without creative work, and connection manners meeting a requirement of a folding function of the folding roof 300 can be used, and are not limited herein.

As shown in FIGS. 1 to 11, in the embodiment, the retractable, detachable and portable pet stroller further includes a handle 400, the handle 400 is detachably and rotatably connected with the top frame 230, and the top frame 230 is provided with a rotating mechanism 260 for rotating the handle 400.

It can be understood that the provided handle 400 can provide an effect when the stroller basket 200 is used alone, and the handle 400 is detachably connected with the stroller basket 200, such that an occupied space can be reduced after detachment during storage; meanwhile, due to the provided rotating mechanism 260, the handle 400 can be rotated and horizontally placed when the stroller basket 200 is fixed on the stroller body 100 at ordinary times, use of the folding roof 300 is not influenced, and when the handle 400 is required to be used, normal use can be realized only by rotating the handle 400 to be vertical.

In use, the first rod body 251 and the second rod body 252 on the stroller basket 200 are rotated to be vertical, the slide fastener 253 is slid downwards to the connection position of the first rod body 251 and the second rod body 252 to complete unfolding and fixation of the stroller basket 200, and the stroller basket 200 is then mounted on the stroller body 100; during mounting, a second hook 213 is clamped on one cross beam column of the stroller body 100, and after the clamping, the stroller basket 200 is rotated to be horizontally placed on the stroller body 100, and at this point, a push plate 214 of the first locking mechanism 210 is pulled, and the push plate 214 drives a first hook 212 to retract, such that the stroller basket 200 can be completely horizontally placed on the stroller body 100, and at this point, the push plate 214 is released, the first hook 212 is clamped on the other cross beam of the stroller body 100 to complete the fixation; the folding roof 300 and the stroller basket 200 are then fixed by the second locking mechanism 310, and at this point, a pet can be placed in the stroller basket 200, the folding roof 300 is closed, an output end of the folding roof 300 is fixed by the third locking mechanism 220, and the folding roof 300 is prevented from being unfolded; finally, the handle 400 is fixed on the rotating mechanism 260 by the fourth locking mechanism, and the handle 400 is rotated to the same horizontal direction as the stroller basket 200 by the rotating mechanism 260, and use of the device can be completed.

Second Embodiment

Referring to FIGS. 1 to 11, based on the first embodiment, the first locking mechanism 210 includes a housing 211, the first hook 212, the second hook 213, the push plate 214 and a first return spring 215, the housing 211 is provided on one side of a bottom of the bottom frame 240, a first accommodating cavity 216 and a first through hole 217 are provided in the housing 211, the push plate 214 and the first return spring 215 are located in the first accommodating cavity 216, the push plate 214 is slidably connected with an inner wall of the housing 211, one end of the first return spring 215 is fixedly connected with the inner wall of the housing 211, the other end of the first return spring 215 is fixedly connected with the push plate 214, the first hook 215 penetrates through the first through hole 217 to be connected with the push plate 214, and the second hook 213 is provided at the bottom of the bottom frame 240.

It may be appreciated that with the arrangement, when the stroller basket 200 is required to be fixed on a stroller frame, the second hook 213 is hooked on one cross beam column of the stroller frame, the stroller basket is rotated to be horizontally placed on the stroller frame, and at this point, the other cross beam column abuts against a bottom of the first hook 212, the push plate 214 is then pulled, the first hook 212 is driven by the push plate 214 to retract, and is released from abutting against the other cross beam column, and at this point, the stroller basket 200 can be placed on the stroller frame completely, the push plate 214 is then loosened, and under an action of the first return spring 215, the push plate 214 is pushed and drives the first hook 212, and the first hook 212 is hooked on the other cross beam column to accomplish fixation of the stroller basket 200 and the stroller body 100; when the stroller basket 200 and the stroller body 100 are required to be separated, the push plate 214 is pulled similarly, the first hook 212 is separated from the other cross beam column, the stroller basket 200 can be rotated away from the stroller body 100, and clamping between the second hook 213 and the cross beam column is released.

Third Embodiment

Referring to FIGS. 1 to 11, based on the above embodiments, the second locking mechanism 310 includes a first rotating part 311, a second rotating part 312 and a clamping part 313, the first rotating part 311 is rotatably connected with one side of the clamping part 313, the second rotating part 312 is rotatably connected with the other side of the clamping part 313, and both the first rotating part 311 and the second rotating part 312 are connected with the movable frame 330; the top frame 230 is further sleeved with a fixed block 265, and the fixed block 265 is provided with a clamping groove 268 for fixing the clamping part 313.

It can be understood that the folding roof 300 can be fixed on the stroller basket 200 by the second locking mechanism 310, the fixation can be completed only by inserting the clamping part 313 into the clamping groove 268 in the fixed block 265 provided on the top frame 230, the clamping part 313 is provided with a folding and unfolding part, the folding and unfolding part is provided with a wedge-shaped hook, a groove is provided in the clamping groove 268, and when the clamping part 313 is inserted into the clamping groove 268, the wedge-shaped hook is hooked on the groove in the clamping groove 268 to finish the fixation; when the folding roof 300 is required to be separated, the folding and unfolding part is only required to be pulled, the wedge-shaped hook on the folding and unfolding part is separated from the groove in the clamping groove 268, the fixation is released, the folding roof 300 can be taken down, and the arrangement is easy to operate and convenient and rapid to use; the first rotating part 311 and the second rotating part 312 are both connected with the movable frame 330, and the folding function of the folding roof 300 can be achieved under a rotating action of the first rotating part 311 and the second rotating part 312.

Fourth Embodiment

Referring to FIGS. 1 to 11, based on the above embodiments, the third locking mechanism 220 includes a first fixing part 221, a second fixing part 222, a first inner plug 223, a second return spring 224 and a pair of first buttons 225, the first fixing part 221 is connected with the movable frame 330, the second fixing part 222 is connected with the bottom frame 240, the first fixing part 221 is provided with a third through groove, the first inner plug 223 is located in the third through groove, the first inner plug 223 is provided with a fourth through groove 226, the two first buttons 225 are provided at two ends of the fourth through groove 226 respectively, the second return spring 224 is located in the fourth through groove 226, two ends of the second return spring 224 abut against the two first buttons 225 respectively, two sides of the first fixing part 221 are provided with second through holes 228 for the first buttons 225 to penetrate out respectively, the second fixing part 222 is provided with a fifth through groove 227 for accommodating the first fixing part 221, and two sides of the second fixing part 222 are provided with third through holes 229 for the first buttons 225 to penetrate out respectively.

It may be understood that the movable end of the folding roof 300 can be fixed with the arrangement, and when the folding roof 300 is required to be closed, the movable frame 330 is rotated to approach the top frame 230, and at this point, the two first buttons 225 on the first fixing part 221 are pressed, the first buttons 225 are retracted into the first fixing part 221, the first fixing part 221 can be inserted into the second fixing part 222, and at this point, due to an effect of the second return spring 224, the first button 225 is pushed out of the first fixing part 221 and penetrates out through the third through hole 229 on the second fixing part 222, and a fixing effect of the first fixing part 221 and the second fixing part 222 is achieved, thereby realizing the fixation of the movable end of the folding roof 300; when the folding roof 300 is required to be unfolded, the first button 225 is pressed similarly, the first button 225 is retracted into the first fixing part 221, and the first fixing part 221 and the second fixing part 222 can be separated.

Fifth Embodiment

Referring to FIGS. 1 to 11, based on the above embodiments, the rotating mechanism 260 includes a knob 261, a limiting gear 262, a third return spring 263 and an insert 264, the insert 264 is provided with a first through groove and a second through groove, the limiting gear 262 is slidably connected with the fixed block 265, an end of the limiting gear 262 apart from the fixed block 265 is located in the first through groove, a limiting protrusion is provided on a groove wall of the first through groove, teeth of the limiting gear 262 abut against the limiting protrusion to fix the insert 264, one end of the knob 261 is slidably sleeved with the second through groove, and an end of the knob 261 penetrating through the second through groove is connected with the limiting gear 262; one end of the third return spring 263 abuts against an inner wall of the insert 264, and the other end of the third return spring abuts against an inner wall of the knob 261.

It may be understood that with the arrangement, when the handle 400 is required to be rotated, only the knob 261 is required to be pressed, the knob 261 pushes the limiting gear 262 to move to separate the limiting gear 262 from the insert 264, a limiting effect of the limiting gear 262 on the insert 264 is lost, and the insert 264 can rotate to drive the handle 400 to rotate; after the handle 400 is rotated to a required position, the knob 261 is released, and under an action of the third return spring 263, the knob 261 is pushed away to drive the limiting gear 262 to move, the limiting gear 262 enters the first through groove to limit the insert 264, and at this point, the insert 264 cannot be rotated, and a fixing effect is achieved on rotation of the handle 400.

Sixth Embodiment

Referring to FIGS. 1 to 11, based on the above embodiments, the handle 400 is provided with a fourth locking mechanism, the fourth locking mechanism includes a second inner plug 410, a fourth return spring 420 and a second button 430, the second inner plug 410 is located in the handle 400, the second inner plug 410 is provided with a sixth through groove 440, the fourth return spring 420 is located in the sixth through groove 440, one end of the fourth return spring 420 abuts against an inner wall of the second inner plug 410, the other end of the fourth return spring abuts against the second button 430, the insert 264 is provided with a second accommodating cavity 266 for accommodating the handle 400, and the handle 400 and the insert 264 are both provided with fourth through holes 267 for the second button 430 to penetrate out.

It may be understood that detachable connection of the handle 400 can be realized by the fourth locking mechanism, and when the handle 400 is required to be connected, the second button 430 on the handle 400 is pressed, the button is retracted into the sixth through groove 440, and at this point, the handle 400 can be inserted into the second accommodating cavity 266 in the insert 264, and under an action of the fourth return spring 420, when the second button 430 moves to the fourth through hole 267, the second button 430 penetrates out of the fourth through hole 267 to realize fixation of the handle 400 and the insert 264; when the handle 400 is required to be taken down, the second button 430 is pressed similarly, the second button 430 is retracted into the sixth through groove 440, the fixing effect on the insert 264 is released, and the handle 400 can be separated from the insert 264.

In summary, the embodiment of the present invention provides the retractable, detachable and portable pet stroller, including the stroller body 100, the stroller basket 200 and the folding roof 300, wherein the stroller body 100 is detachably connected with the stroller basket 200, the first locking mechanism 210 for fixation is provided at the bottom of the stroller basket 200, the folding roof 300 is detachably connected with the stroller basket 200, the second locking mechanism 310 for fixation is provided on the folding roof 300, and the third locking mechanism 220 for fixing the movable end of the folding roof 300 is further provided at the top of the stroller basket 200; with the detachable connection between the stroller basket 200 and the stroller body 100, the folding roof 300 and the stroller basket 200, as well as the handle 400 and the stroller basket 200, the device can be detached and separated during storage, and the occupied space during storage can be reduced; with the provided folding connecting rod 250, the height of the stroller basket 200 can be reduced for folding, the device can be conveniently stored and carried, and operation is easy and convenient; by the provided rotating mechanism 260, the handle 400 can be rotated to a horizontal position when the handle 400 is not suitable, the use of the folding roof 300 is not influenced, and meanwhile, the rotating mechanism 260 is easy to operate and convenient and rapid to use; by the provided third locking mechanism 220, the folding roof 300 can be rapidly closed, fixed and unfolded, and the folding roof 300 can be more rapidly closed when the pet is placed, so as to avoid that the pet jumps out to cause potential safety hazards.

The above description is only preferred embodiments of the present invention and is not intended to limit the present invention, and various modifications and changes may be made to the present invention by those skilled in the art. Any modification, equivalent replacement, or improvement made within the spirit and principle of the present invention shall be included in the protection scope of the present invention.

The invention claimed is:

1. A retractable, detachable and portable pet stroller, comprising a stroller body, a stroller basket and a folding roof, wherein the stroller body is detachably connected with the stroller basket, a first locking mechanism for fixation is provided at a bottom of the stroller basket, the folding roof is detachably connected with the stroller basket, a second locking mechanism for fixation is provided on the folding roof, and a third locking mechanism for fixing a movable end of the folding roof is further provided at a top of the stroller basket;

wherein the stroller basket comprises a bottom frame, a top frame and a plurality of folding connecting rods, one end of each of the plural folding connecting rods is rotatably connected with the bottom frame, the other end of each of the plural folding connecting rods is rotatably connected with the top frame;

wherein the first locking mechanism comprises a housing, a first hook, a second hook, a push plate and a first return spring, the housing is provided on one side of a bottom of the bottom frame, a first accommodating cavity and a first through hole are provided in the housing, the push plate and the first return spring are located in the first accommodating cavity, the push plate is slidably connected with an inner wall of the housing, one end of the first return spring is fixedly connected with the inner wall of the housing, the other end of the first return spring is fixedly connected with the push plate, the first hook penetrates through the first through hole to be connected with the push plate, and the second hook is provided at the bottom of the bottom frame.

2. The retractable, detachable and portable pet stroller according to claim 1, wherein the folding connecting rod comprises a first rod body, a second rod body and a slide fastener, one end of the first rod body is rotatably connected with the top frame, the other end of the first rod body is rotatably connected with the second rod body, an end of the second rod body apart from the first rod body is rotatably connected with the bottom frame, and the slide fastener is slidably fitted over the first rod body.

3. The retractable, detachable and portable pet stroller according to claim 1, wherein the roof comprises folding cloth, a movable frame and a plurality of support frames, the folding cloth comprises a plurality of cloth bodies distributed in a sector shape, the plurality of support frames are connected with the plurality of cloth bodies at intervals respectively, two ends of the folding cloth are connected with two ends of the movable frame respectively, and the second locking mechanism is provided on the movable frame.

4. The retractable, detachable and portable pet stroller according to claim 3, wherein the second locking mechanism comprises a first rotating part, a second rotating part and a clamping part, the first rotating part is rotatably connected with one side of the clamping part, the second rotating part is rotatably connected with the other side of the clamping part, and both the first rotating part and the second rotating part are connected with the movable frame; the top frame is further sleeved with a fixed block, and the fixed block is provided with a clamping groove for fixing the clamping part.

5. The retractable, detachable and portable pet stroller according to claim 3, wherein the third locking mechanism comprises a first fixing part, a second fixing part, a first inner plug, a second return spring and a pair of first buttons, the first fixing part is connected with the movable frame, the second fixing part is connected with the bottom frame, the first fixing part is provided with a third through groove, the first inner plug is located in the third through groove, the first inner plug is provided with a fourth through groove, the two first buttons are provided at two ends of the fourth through groove respectively, the second return spring is located in the fourth through groove, two ends of the second return spring abut against the two first buttons respectively, two sides of the first fixing part are provided with second through holes for the first buttons to penetrate out respectively, the second fixing part is provided with a fifth through groove for accommodating the first fixing part, and two sides of the second fixing part are provided with third through holes for the first buttons to penetrate out respectively.

6. The retractable, detachable and portable pet stroller according to claim 5, further comprising a handle, wherein the handle is detachably and rotatably connected with the top frame, and the top frame is provided with a rotating mechanism for rotating the handle.

7. The retractable, detachable and portable pet stroller according to claim 6, wherein the rotating mechanism comprises a knob, a limiting gear, a third return spring and an insert, the insert is provided with a first through groove and a second through groove, the limiting gear is slidably connected with the fixed block, an end of the limiting gear apart from the fixed block is located in the first through groove, a limiting protrusion is provided on a groove wall of the first through groove, and teeth of the limiting gear abut against the limiting protrusion to fix the insert;

one end of the knob is slidably sleeved with the second through groove, and an end of the knob penetrating through the second through groove is connected with the limiting gear; one end of the third return spring abuts against an inner wall of the insert, and the other end of the third return spring abuts against an inner wall of the knob.

8. The retractable, detachable and portable pet stroller according to claim 7, wherein the handle is provided with a fourth locking mechanism, the fourth locking mechanism comprises a second inner plug, a fourth return spring and a second button, the second inner plug is located in the handle, the second inner plug is provided with a sixth through groove, the fourth return spring is located in the sixth through groove, one end of the fourth return spring abuts against an inner wall of the second inner plug, the other end of the fourth return spring abuts against the second button, the insert is provided with a second accommodating cavity for accommodating the handle, and the handle and the insert are both provided with fourth through holes for the second button to penetrate out.

\* \* \* \* \*